July 29, 1947.  S. MALKE  2,424,892
ELECTRIC RESISTANCE WELDING FIXTURE
Filed April 25, 1945  3 Sheets-Sheet 3
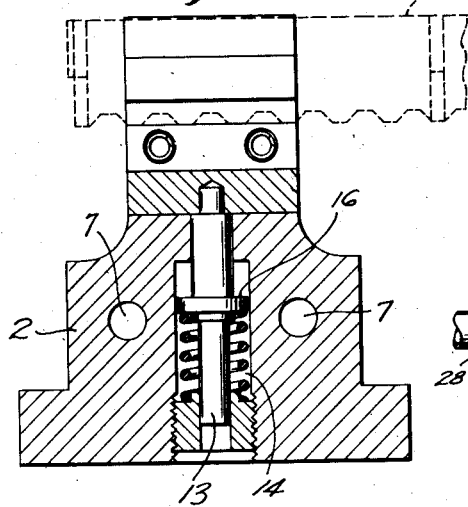
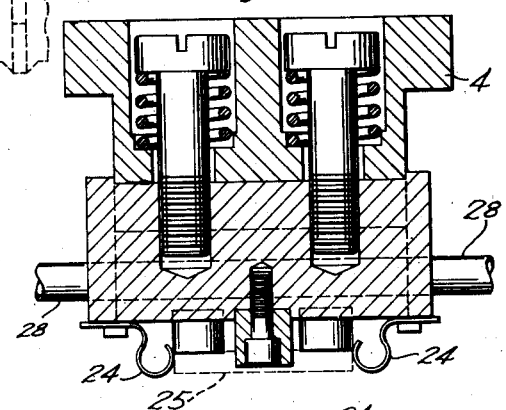
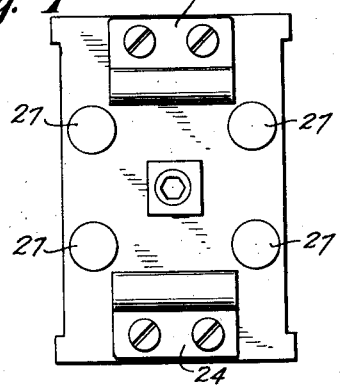
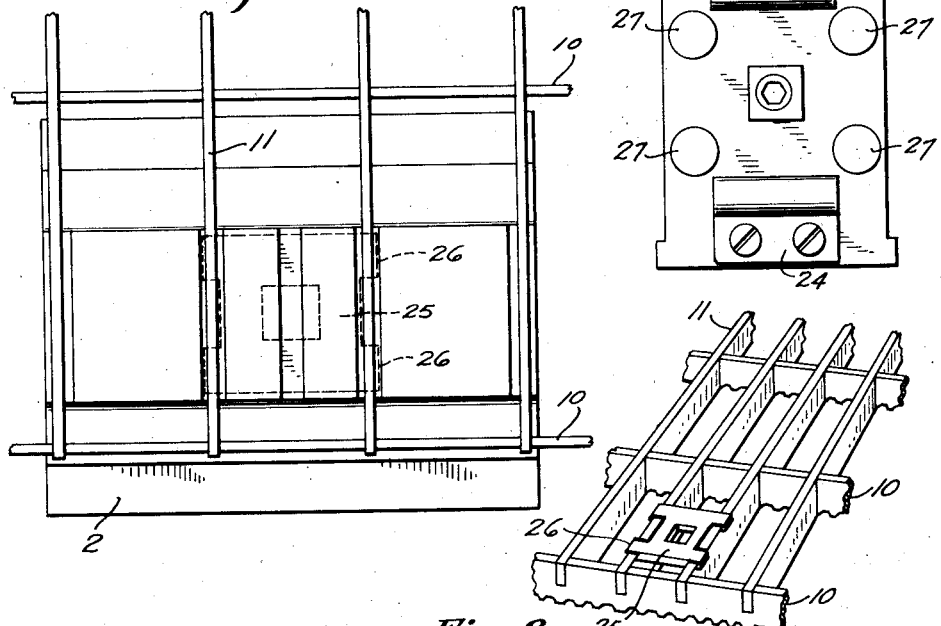
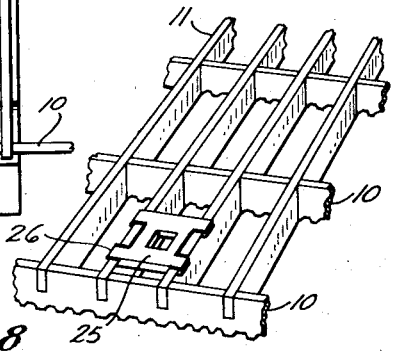
INVENTOR.
Sven Malke
BY
Attorney Patented July 29, 1947

2,424,892

UNITED STATES PATENT OFFICE 2,424,892

ELECTRIC RESISTANCE WELDING FIXTURE

Sven Malke, Milwaukee, Wis., assignor to A. O. Smith Corporation, Milwaukee, Wis., a corporation of New York Application April 25, 1945, Serial No. 590,222

12 Claims. (Cl. 219—4)

This invention relates to an electric resistance welding fixture.

The invention has been applied to the pressure welding of holddown plates to metal grating wherein the electrodes are applied to the parts near the joints to be welded and the two welds are made simultaneously.

One of the objects of the invention is to provide electrode means for entering the spaces between grating bars and laterally engaging the respective bars for transmitting current thereto.

Another object of the invention is to provide equalizing means for simultaneously applying welding pressure for the two welds between the holddown plate and two spaced bars of the grating.

Another object is to utilize the movement of the work pieces by one electrode to move the opposite electrode into position laterally against one of the pieces for applying current thereto.

Another object is to provide for a separation of the pressure application and electrical contact functions of the electrodes in order to preserve the edge portion of the grating bar against undesired deformation.

The invention has been embodied in a fixture illustrated in the accompanying drawing in which:

Fig. 4 is a section taken substantially at right angles to Fig. 1 through the lower welding die on line 4—4 of Fig. 1;

Fig. 5 is a vertical section taken substantially at right angles to Fig. 1 centrally through the upper welding die on line 5—5 of Fig. 1;

Fig. 6 is a top plan view of the lower dies showing the grating in place, and showing the holddown plate in light dash lines;

Fig. 7 is a bottom plan view of the upper dies; and

Fig. 8 is a perspective view showing a part of a grating with the holddown plate welded thereto.

Figure 1:
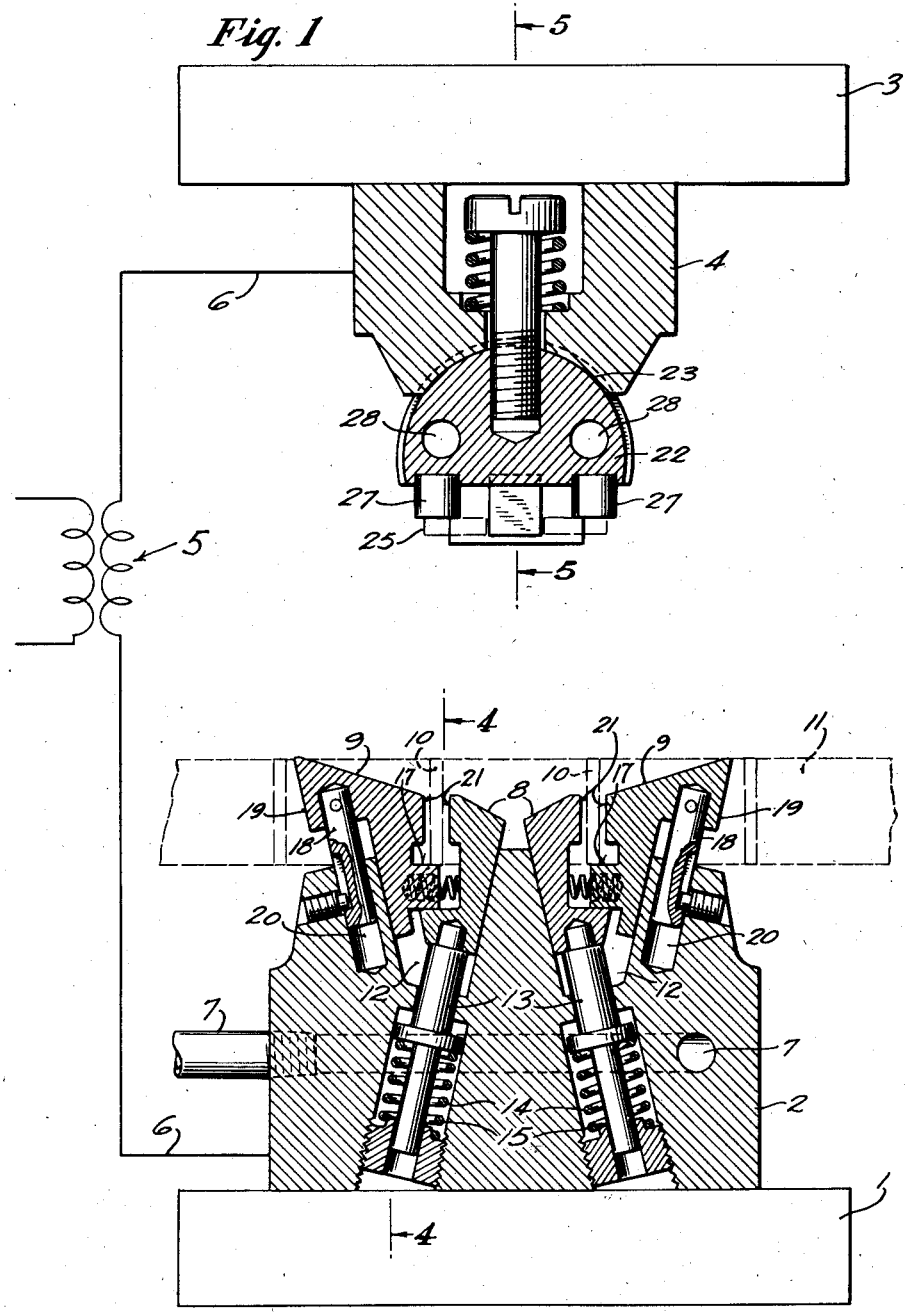
Figure 1 is a transverse section through the welding fixture showing the same in open position for receiving the work pieces to be welded.

The welding machine comprises, in general, a fixed base 1 having an electrode supporting block 2 thereon, a movable upper frame 3 having an electrode supporting block 4 thereon, and a transformer 5 with flexible secondary leads 6 to the respective electrode supporting blocks 2 and 4 for supplying welding current thereto.

The lower electrode supporting block 2 is water cooled by circulating water through ducts 7 therein. The block 2 supports two pairs of electrode dies each pair comprising an inner electrode 8 and an outer electrode 9 and each pair being adapted to engage a separate bar 10 of the grating 11 and to transmit welding current and pressure thereto.

The corresponding electrodes 8 and 9 are mounted in respective wedge-shaped grooves 12 in the block 2, and are adapted to move upwardly and downwardly along the slanting walls of the groove, one on each side. One of the electrodes, preferably the inner electrode 8, is biased upwardly by a piston 13 extending downwardly therefrom axially of a cylinder 14 wherein a coil spring 15 pushes upwardly upon the piston head 16. The other electrode, preferably the outer electrode 9, has a horizontal projection 17 supported on a flat-topped projection of electrode 8 so that as electrode 8 moves up or down the electrode 9 may move correspondingly, and as electrode 9 may be pressed downwardly it will force electrode 8 downwardly against spring 15.

The electrode 9 is guided in its movement by the rear pin 18 secured to a flange 19 on the upper end of the electrode and extending downwardly into a dowel hole 20 in block 2 parallel with the slanting outer wall of groove 12. The cylinders 14 extend parallel to the opposite slanting wall of groove 12 to guide the electrode 8 in its movement up and down.

The corresponding electrodes 8 and 9 have opposed vertical contact surfaces 21 adapted to engage the opposite sides of a bar 10 under pressure and to transmit the welding current thereto. One of the electrodes, preferably the outer electrode 9 has a flat top on its projection 17 which is adapted to receive the lower edge of bar 10 and support the bar against welding pressures.

Both corresponding electrodes 8 and 9 are cut away below the contact faces 21 so as not to engage the bar 10 below the latter.

In operation, when the grating is in place and pressed downwardly for welding, bars 10 engage the corresponding ledges 17 and push the electrodes 9 downwardly, thereby also pushing electrodes 8 downwardly against springs 15. As the corresponding electrodes 8 and 9 move downwardly in the wedge-shaped groove 12 they are wedged closer together until their contact faces 21 engage the opposite sides of the bars 10 under substantial pressure and are ready for transmitting the welding current thereto.

The upper electrode supporting block 4 carries the electrode 22 loosely suspended therein and having a semi-circular upper surface fitting into a complementary semi-circular groove 23 in the block to provide for limited rotary movement of the electrode 22 for the purpose of equalizing the welding pressure between its opposite sides.

The opposite ends of the electrode 22 have spring clips 24 for holding a holddown plate 25 to be welded to the bars 10 of grating 11. The holddown plate 25 has corner extensions 26 adapted to be welded to the upper edges of the respective bars 10, and electrode 22 has downwardly extending contact projections 27 for engaging the extensions 26 and transmitting thereto both the welding current and the welding pressure.

Figure 2:
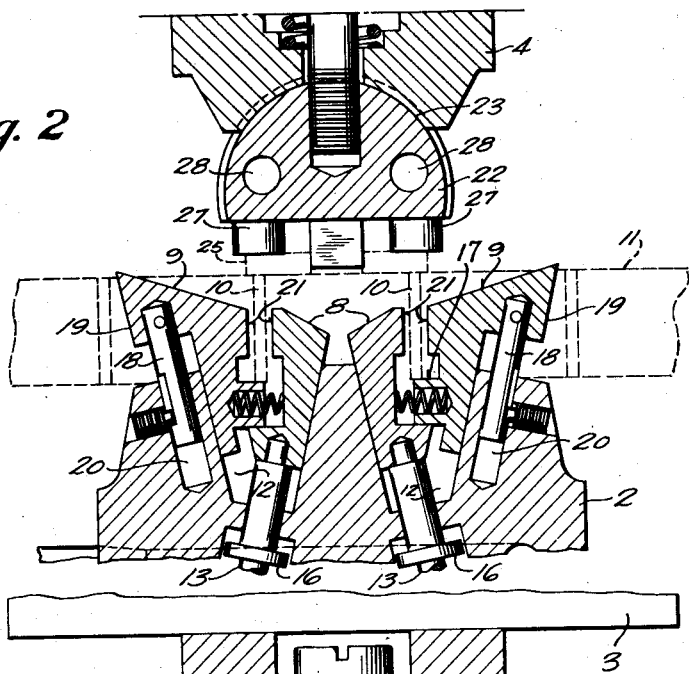
Fig. 2 is a similar section with parts cut away and showing the work pieces in place just prior to the welding operation.
Figure 3:
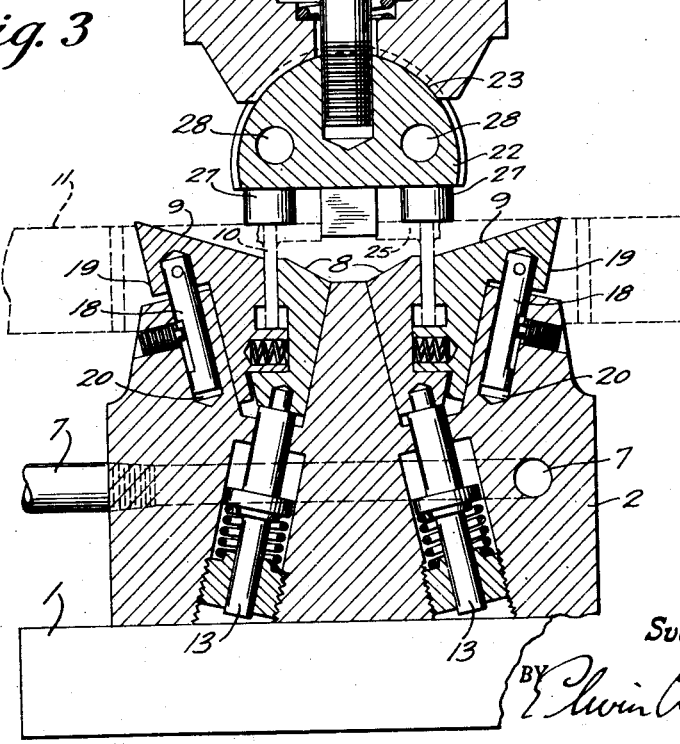
Fig. 3 is a similar section showing the dies closed and the welding completed.

In operation, when the grating 11 and plate 25 have been placed in the machine as illustrated in dotted lines in Fig. 1, the frame 3 is moved downwardly by suitable means, either hydraulic or mechanical, and the plate 25 engages the top edges of bars 10 as shown in Fig. 2. Further movement of the frame 3 downwardly forces the bars 10 down along with the electrodes 8 and 9 until the electrode faces 21 tightly grip the bars 10. Then the welding current is applied by transformer 5 through leads 6 and across the two joints between electrode 22 and plate 25 on the one hand and electrodes 8 and 9 and the corresponding bars 10 on the other hand to thereby pass welding current across the contacting surfaces of plate 25 and bars 10.

The welding pressure is applied by further downward movement of frame 3 and electrode 22 as the parts become softened by resistance heating and the projections 26 are mashed into the upper edges of the bars 10 until plate 25 is flush with the top of bars 10.

The welding current is then cut off and after a moment the frame 3 with its block 4 and electrode 22 is withdrawn upwardly. The springs 15 push the electrodes 8 and 9 upwardly releasing the bars 10 and the grating 11 with the plate 25 welded thereto may then be removed.

The electrode 22, being capable of limited rotation, adjusts itself so as to apply equal pressure between plate 25 and each of the bars 10. The electrode 22 is water cooled by ducts 28 therein.

The invention may have various embodiments within the scope of the accompanying claims.

I claim:

1. An electric resistance welding fixture comprising an electrode adapted to apply welding pressure to two different joints to be welded simultaneously, and a support for said electrode having a semi-circular groove therein with its axis parallel to and substantially centrally between the joints, said electrode being complemental to said groove and being supported therein for self adjustment to equalize the pressure applied to the two joints.

2. In a device of the class described, an electrode adapted to apply welding current to a workpiece to weld the same to a second workpiece, and a spring clip on the electrode adapted to engage the workpiece and suspend the same in contact with said electrode preparatory to welding the workpieces together and to automatically release the first named workpiece upon welding engagement of the workpieces and withdrawal of said electrode therefrom.

3. In a device of the class described adapted to weld a member to the edge of a metal strip, an electrode for supplying current to the strip and preventing its collapse under edgewise welding pressures, comprising a pair of electrode members adapted to grip opposite sides of the strip, said electrode members being indexed relative to one edge of the strip to prevent movement of the same along the faces of the strip.

4. In a device of the class described adapted to weld a member to the edge of a metal strip, an electrode for supplying current to a member to be welded, comprising a pair of electrode members adapted to grip opposite sides of the strip, said electrode members being indexed relative to one edge of the strip and one of said members engaging the edge of the strip to apply welding pressure thereto.

5. In a device of the class described adapted to weld a member to a metal strip, an electrode for supplying current and welding pressure to a member to be welded, and a second electrode comprising a pair of electrode members adapted to grip opposite sides of the strip, said electrode members being indexed relative to one edge of the strip and the gripping pressure of said members against the strip being in response to the welding pressure applied by said first named electrode.

6. In a device of the class described adapted to weld a member to a metal strip, an electrode for supplying current to the member to be welded and comprising a pair of electrode members adapted to grip opposite sides of the strip, and means to apply welding pressure to the strip, said electrode members being mounted to move angularly toward one another to clamp the strip under the application of welding pressure to the strip.

7. In a device of the class described adapted to weld a member to a metal strip, an electrode for supplying current to the member to be welded and comprising a pair of electrode members adapted to grip opposite sides of the strip, a support for said electrode members having a wedge-shaped groove for receiving the same, and means guiding said members in their movement inwardly and outwardly of said groove to provide for the required gripping and release of the strip thereby.

8. In a device of the class described adapted to weld a member to a metal strip, an electrode for supplying current to the member to be welded and comprising a pair of electrode members adapted to grip opposite sides of the strip, a support for said electrode members having a wedge-shaped groove for receiving the same, means guiding said members in their movement inwardly and outwardly of said groove to provide for the required gripping and release of the strip thereby, and means biasing said members outwardly of said groove.

9. In an electric resistance welder, an electrode having a generally V-shaped groove in its upper surface, a pair of electrode contact members disposed in said groove, each member fitting a corresponding side wall of the groove and said members being spaced apart to receive a part to be welded, means biasing said members outwardly of the groove, means biasing said members apart and against the corresponding opposite side walls of the groove, means to apply pressure to the part to be welded to force the same against at least one of said electrode contact members and means on said members for effecting inward movement thereof against said biasing means upon application of pressure thereto by said part to thereby effect gripping of the sides of said part by said members.

10. In an electric resistance welder, an electrode having a pair of generally V-shaped grooves in its upper surface, a pair of electrode contact members disposed in each of said grooves, each member fitting a corresponding sidewall of the respective groove and the members of each pair being spaced one to receive a part of the workpieces to be welded, means biasing said members outwardly of the corresponding grooves, means biasing the members of each pair apart and against the corresponding opposite side walls of the respective groove, a second electrode disposed above said first named electrode and adapted to contact a second workpiece to be welded to the respective parts of the first workpiece, means on said first named electrode contact members for effecting inward movement thereof against said biasing means upon application of pressure thereto by said workpieces under the welding contact pressure of said second electrode to thereby effect gripping of the sides of the parts of the first named workpiece by the corresponding members, means to press said electrodes toward one another to effect welding contact pressures between the workpieces, and means to equalize the welding contact pressures between said second named workpiece and the individual parts of said first-named workpiece.

11. An electric welding fixture comprising an electrode having a pair of electrode contact members disposed to receive a part of a workpiece to be welded, a second electrode disposed above said first named electrode and adapted to contact a second workpiece to be welded separately and simultaneously to the respective parts of the first workpiece, means to press said electrodes toward one another to effect welding contact pressures between the workpieces, and a pivotal support for said second electrode having a semi-circular groove therein with its axis parallel to and substantially centrally between the separate joints for said workpiece, said second electrode being complemental to said groove and being supported therein for self adjustment to equalize the welding contact pressures applied by the electrodes at the joints between the said workpieces.

12. An electric resistance welding fixture comprising an electrode having a pair of electrode contact members disposed to receive a part of a workpiece to be welded, a second electrode disposed above said first named electrode, a spring clip on the working end of said second electrode adapted to engage a second workpiece and suspend the same in contact with the second electrode for welding said workpiece to the respective part of the first workpiece disposed within said contact members, and means to press said electrodes toward one another to effect welding contact pressures between the workpieces, said clip automatically releasing the workpieces after welding engagement of the workpieces under the contact pressures of the electrodes and withdrawal of the first named electrode therefrom.

SVEN MALKE.

REFERENCES CITED

The following references are of record in the file of this patent:

UNITED STATES PATENTS

| Number | Name | Date |
|---|---|---|
| 2,005,752 | Pfaustiehl | June 25, 1935 |
| 2,260,866 | Powell | Oct. 28, 1941 |
| 2,330,658 | Albright | Sept. 28, 1943 |
| 1,354,293 | Gravell | Sept. 28, 1920 |
| 1,992,990 | Burns | Mar. 5, 1935 |
| 2,097,377 | Martin | Oct. 26, 1937 |